United States Patent [19]
Henderson et al.

[11] 3,938,859
[45] Feb. 17, 1976

[54] CHILD SAFETY SEAT FOR VEHICLES WITH HARNESS RELEASE INACCESSIBLE TO CHILD PASSENGER

[75] Inventors: Cyril Henderson, Woodland Hills; John N. Broughton, Northridge, both of Calif.

[73] Assignee: American Safety Equipment Corporation, Encino, Calif.

[22] Filed: May 20, 1974

[21] Appl. No.: 471,465

[52] U.S. Cl. ............ 297/385; 297/253; 297/DIG. 2
[51] Int. Cl.² ......................................... A62B 35/00
[58] Field of Search .......... 297/384, 385, 388, 390, 297/DIG. 2, 253, 254, 255, 256, 377, 192, 232

[56] References Cited
UNITED STATES PATENTS

| | | | |
|---|---|---|---|
| 3,335,434 | 8/1967 | Gamon | 297/DIG. 2 |
| 3,563,600 | 2/1971 | Converse | 297/254 |
| 3,596,986 | 8/1971 | Ragsdale | 297/DIG. 2 |
| 3,606,453 | 9/1971 | Cicero | 297/385 X |
| 3,709,558 | 1/1973 | Jakob | 297/389 |
| 3,746,390 | 7/1973 | Koah | 297/192 |

*Primary Examiner*—James T. McCall

[57] ABSTRACT

A child safety seat for use in vehicles is provided with a safety harness mounted to the seat with releasable buckling parts positioned and maintained in a buckle-receiving cavity formed in the child safety seat base beneath the portion thereof a child passenger is seated upon to place and maintain such buckling parts in a generally inaccessible location relative to a child seated in the child safety seat. The buckle-receiving cavity is formed integrally of a pedestal-type base with a forwardly opening aperture having a guide fitting for guiding a crotch strap to the cavity and maintaining one of the buckling parts thereunder and a rear webbing slot for introduction of a strap associated with harness shoulder straps which is connected to a mating buckling part also positioned and maintained within the cavity.

8 Claims, 7 Drawing Figures

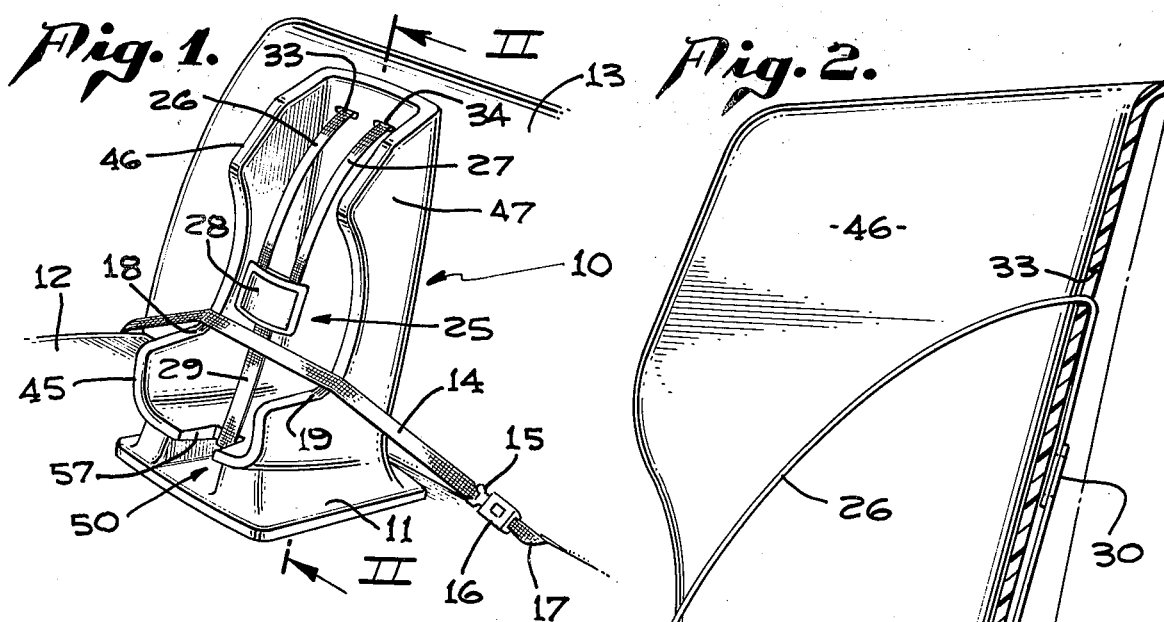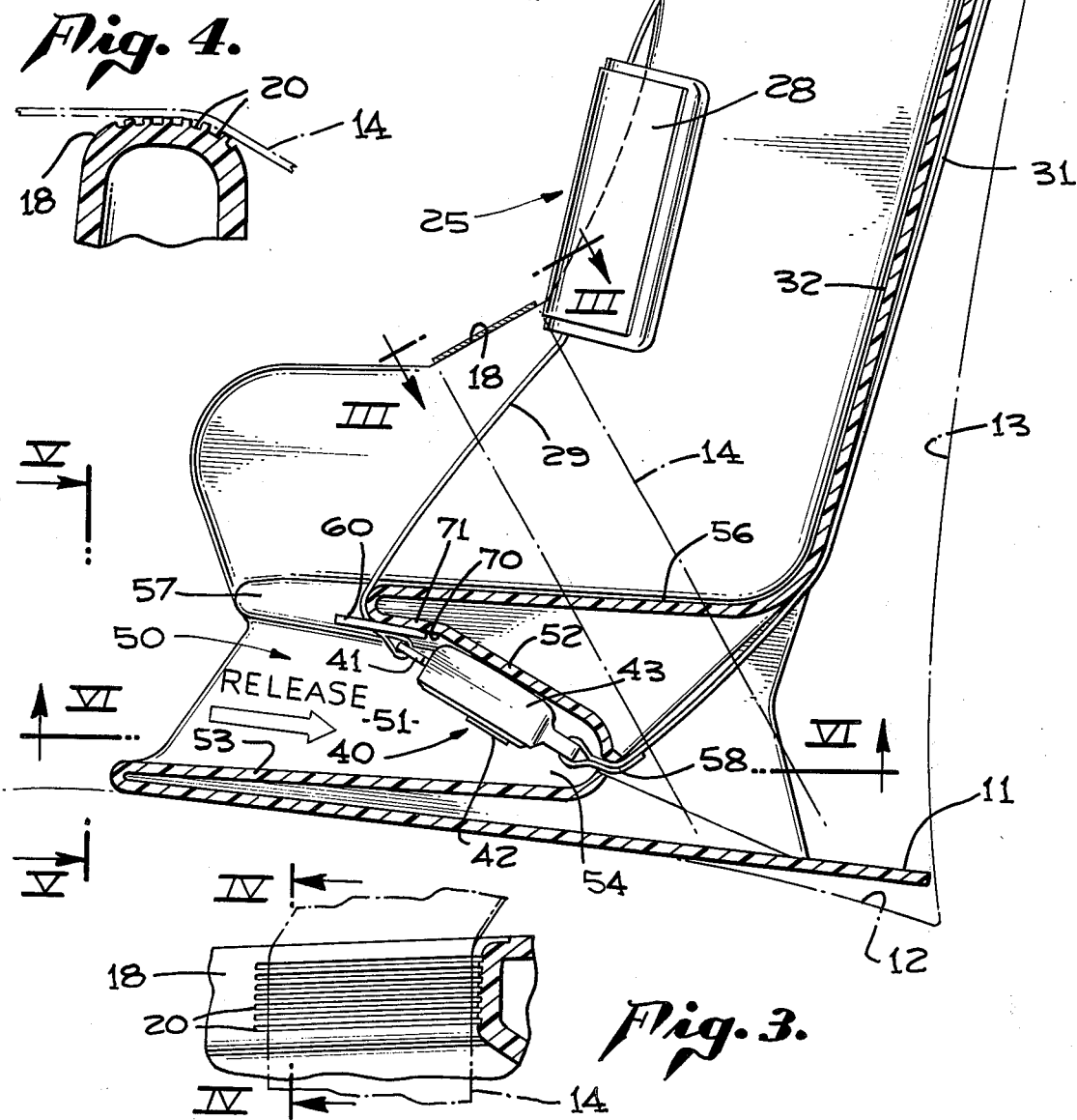

U.S. Patent Feb. 17, 1976 Sheet 2 of 2 3,938,859
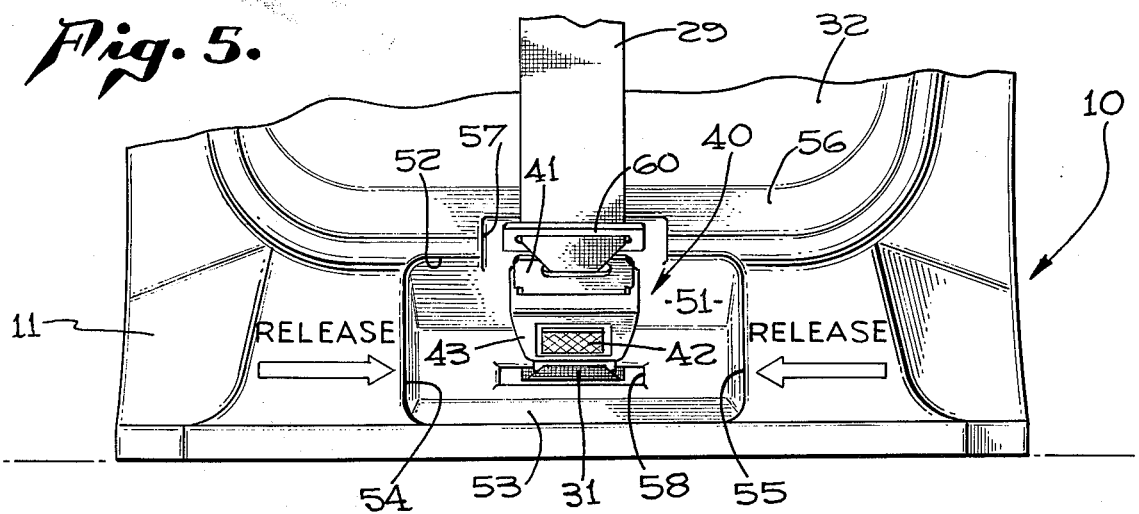
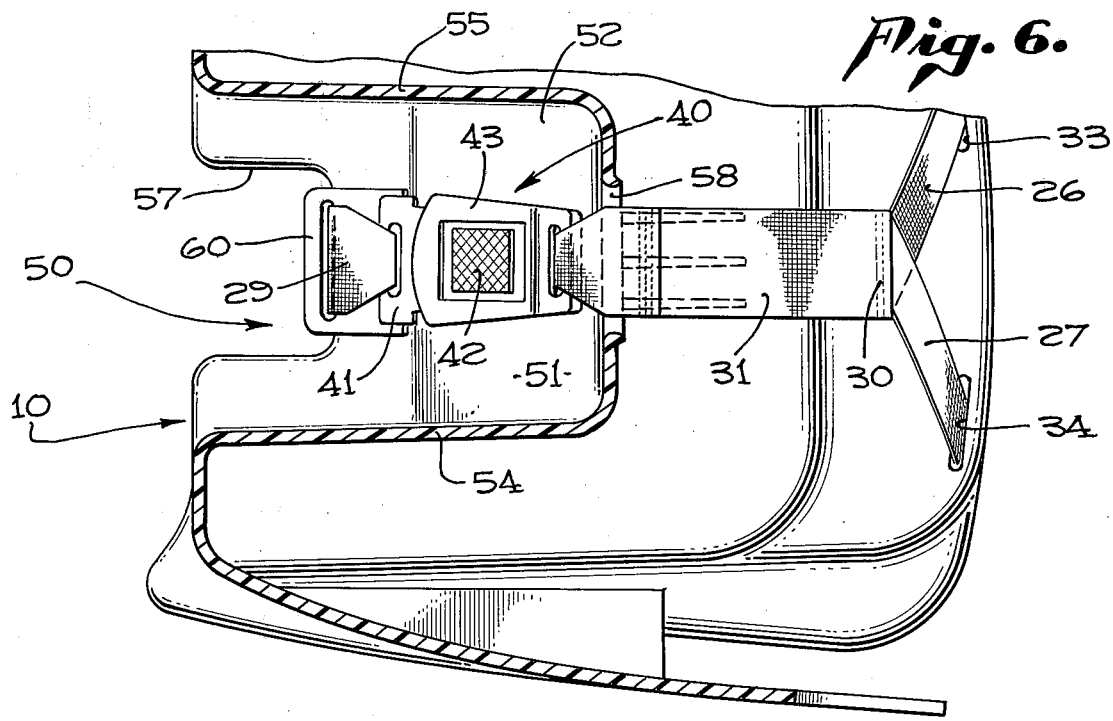
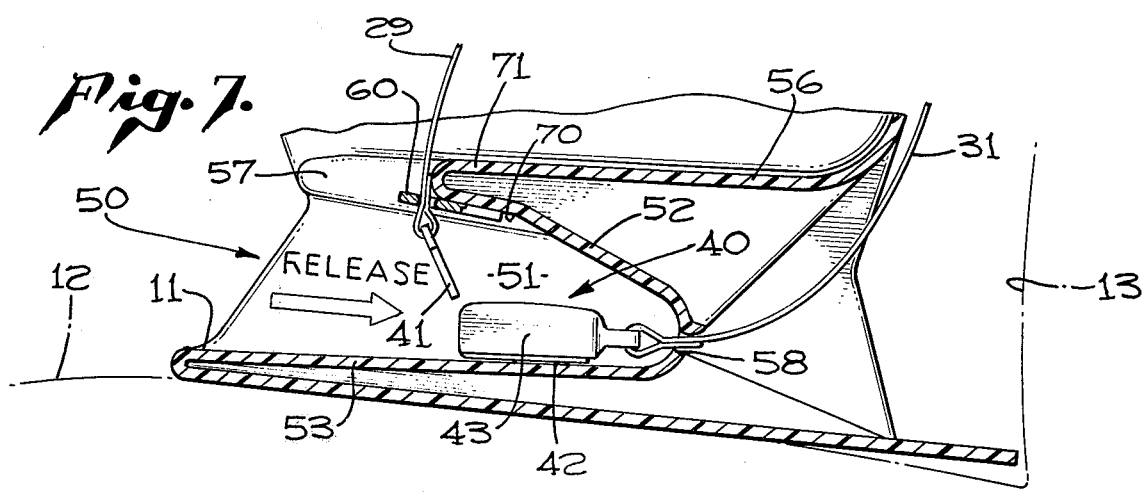

CHILD SAFETY SEAT FOR VEHICLES WITH HARNESS RELEASE INACCESSIBLE TO CHILD PASSENGER

BACKGROUND OF THE INVENTION

The present invention relates in general to child safety seats for use in vehicles for restraining the child passenger in the vehicle, and more particularly to an improvement in construction of such child safety seats wherein the releasable buckling parts for the harness arrangement is positioned in a generally inaccessible location relative to the child passenger, yet readily available to other passengers in the vehicle.

A variety of child safety seats have been devised and constructed heretofore for supporting and restraining children in vehicles such as automobiles. Many of these child safety seats are used for supporting infants and small children in locations outside of the vehicle as well as in the vehicle. It has been found that conventional safety belts and harnesses devised for adult passenger usage in automobiles are less desirable for use with infants or small children. Therefore, most child safety seats developed heretofore have provided harness arrangements in association with the child safety seat with the seat and/or harness in turn being connected to the preexisting seat belts in the vehicle.

However, where the releasable buckling parts or fittings for a harness or seat belt are within the reach of a child or an infant, there is always the possibility that the child or infant will inadvertently release the mechanism and thus release the safety restraint intended and provided by the child safety seat and its associated harness arrangement.

It is, therefore, a primary object of the present invention to disclose and provide an improved child safety seat construction for use in vehicles wherein the releasable buckling parts or fittings associated with a harness for the child safety seat are generally inaccessible to the infant or child passenger in the child seat.

It is another object of the present invention to disclose and provide a child safety seat construction as in the foregoing object wherein the child safety seat construction incorporates receptacle means in the seat in a generally inaccessible location to the child passenger in which the buckling parts may be maintained in such a manner that the child will not be able to easily reach them, yet another passenger, such as an adult passenger who is placing the child into or out of the seat, can easily reach the buckling means.

SUMMARY OF THE INVENTION

Generally stated, the present invention in child safety seat construction includes the provision of a buckle receptacle means positioned generally under the surface of the child safety seat upon which the child sits and providing means for maintaining the buckle parts therein when connected or released. More specifically, the within invention contemplates the provision of a buckle-receiving cavity formed integrally of the base of a child safety seat with the cavity positioned beneath the area upon which the child sits, but above the bottom surface of the seat which rests upon the vehicle seats. Such cavity preferably has a forwardly opening aperture for ease of manipulation of the buckle part by a passenger other than the child passenger and, in order to increase the inaccessibility of the buckle parts, preferably has an upper and inner recess area into which the buckle parts recede on connection and tensioning of the associated straps so that they are out of the way of an infant or child's grasp, yet readily accessible to another vehicle passenger who may find it necessary to release the child from the child safety seat in a hurry, particularly in the event of an emergency.

Various advantages of the present improvement in child safety seat construction, as well as additional objects thereof, will become apparent to those skilled in the art from a consideration of the following detailed explanation of a preferred exemplary embodiment of seat construction. Reference will be made to the appended sheets of drawings which will now be briefly described.

BRIEF DESCRIPTION OF THE DRAWINGS

FIG. 1 is a perspective view of an exemplary child safety seat for use in vehicles including the improvement in means for maintaining a harness release buckle in a generally inaccessible location to the child passenger in accordance with the present invention;

FIG. 2 is a vertical section view of the child safety seat of FIG. 1 taken therein along the plane II—II;

FIG. 3 is a detailed view of a portion of the child safety seat of FIG. 2 taken therein along the plane III—III;

FIG. 4 is a section view of the portion of the child safety seat of FIGS. 1 and 2 illustrated in FIG. 3, taken therein along the plane IV—IV.

FIG. 5 is a detailed front view of a portion of the child safety seat of FIG. 2 showing the buckle-receiving cavity formed integrally of the exemplary emobdiment of child safety seat of FIG. 2 taken therein along the plane V—V;

FIG. 6 is a section view, looking upwardly, along the plane VI—VI in FIG. 2; and FIG. 7 is a detailed view of the child safety seat construction of FIG. 2 showing the releasable buckle parts for the harness in released condition.

DESCRIPTION OF THE PREFERRED EXEMPLARY EMBODIMENT

The preferred exemplary embodiment of child safety seat, in accordance with the present invention, is indicated generally at 10, and as best seen in FIG. 1, is preferably provided with a pedestal-type base 11 for mounting on a vehicle seat 12 against the seat back 13. The child safety seat is preferably formed of a one-piece molded plastic material as generally known heretofore in the art. In the exemplary embodiment, the child safety seat, indicated generally at 10, is restrained upon vehicle seat 12 by wrapping the preexisting vehicle lap belt strap 14 across the child safety seat and connecting the associated end fitting 15 to a complementary buckle part 16, the latter being anchored in conventional manner to a floor-anchored strap 17.

As explained in more detail in the co-pending application Ser. No. 471,457, filed May 20, 1974, now abandoned, entitled "Child Safety Seat for Vehicles with Improved Seat Restraining Means," the exemplary embodiment of child safety seat is provided with load-bearing surfaces 18 and 19, seen in FIG. 1, over which strap 14 passes. These load-bearing surfaces 18 and 19 preferably include means for raising the co-efficient of friction between the surfaces 18 and 19, and the underside of safety belt strap 14 in order to restrain the child safety seat against lateral or twisting motion on the vehicle seat beneath the seat belt. As seen in FIGS. 3 and 4, such means in the exemplary embodiment comprises the provision of a plurality of grooves 20, formed integrally of each of the surfaces 18 and 19, which run transverse to the direction seat belt strap 14 passes thereby.

Normally, the child passenger is placed in the child safety seat and restrained therein by associated harness means before securing the child safety seat to the vehicle seat via the safety belt as explained hereinbefore. In the preferred exemplary embodiment, harness means for restraining the child in the seat are illustrated generally at 25 and include a pair of shoulder straps 26 and 27 connected by an abdominal restraint member 28 to a crotch strap 29. As more fully explained in the co-pending application Ser. No. 472,079, filed May 22, 1974 entitled "Abdominal Restraint and Belt Storage Means for Child Safety Seats for Vehicles," a load-receiving plate (not shown) is disposed within a padded housing or member 29 to adjustably anchor and store excess strap length of the ends of shoulder straps 26 and 27 and crotch strap 29. For purposes of the present application, it need merely be understood that the shoulder straps 26 and 27 are normally connected to crotch strap 29 with the rear ends of straps 26 and 27 being joined at a sewn connection 30 to a back strap running down the outside of the back 32 of the child seat. Appropriate slots 33 and 34 are provided in upper portions of seat back 32 to facilitate passing of the shoulder straps therethrough.

The exemplary embodiment of harness means includes a releasable buckling means indicated generally at 40 which may comprise the buckle of U.S. Pat. No. 3,790,994. As more fully described in said patent, the releasable buckling means indicated generally at 40 comprises a tongue plate 41 which is releasably connectable via push button 42 to a through-load member (not shown) positioned within housing 43 and connected in load transmitting relation to strap 31. This buckle construction is exemplary only, and any type of manually releasable buckling means may be employed with any convenient harness arrangement for restraining a child in a safety seat as in the exemplary embodiment.

As particularly contemplated within the present invention, means are provided for storing and positioning the releasable buckling parts for the exemplary harness means in a position on the child safety seat which is generally inaccessible to the child passenger in the seat, yet is readily available to others, such as an adult passenger in the vehicle who wishes to remove the child from the seat, particularly in an emergency situation. In the exemplary embodiment, such means comprises the provision of a buckle receptacle or cavity, preferably formed integrally of the child safety seat, in a portion of the seat beneath the area of the seat upon which the child sits. By providing a safety belt restraint for the child safety seat, as seen in FIG. 1, with the buckle 16 spaced from the child seat, and through the location of the harness means and releasable buckling means in an inaccessible location, the maintenance of restraint for a child in the exemplary child safety seat construction is assured, while maintaining the ease of release of both the child safety seat and/or the child from the harness arrangement of the seat in normal entry and egress of the child safety seat, and particularly under emergency conditions.

As seen in FIG. 1, the preferred exemplary embodiment of child safety seat is of the pedestal type, wherein the seat portion 45 is mounted up above the vehicle seat 12 by the pedestal portion 11. Seat portion 45 is preferably formed with contoured side walls 46 and 47, which are contoured to provide lateral support and restraint to a child positioned in the seat. The pedestal-type base 11 places the child in a somewhat elevated position on the seat providing leg room for comfort as well as possibly improved visibility from the child seat. The pedestal-type base for the child seat is exemplary in the present embodiment, and it is contemplated that other type base constructions could be employed for a child safety seat within the scope of the present invention.

The buckle receptacle or cavity, aforenoted, is indicated generally at 50, and as seen in FIG. 1 and FIG. 2, provides a forwardly opening aperture through which the releasable buckling parts indicated generally at 40 are readily available to others than the child passenger in the child safety seat.

Referring now particularly to FIGS. 2 and 5 through 7, the exemplary buckle receptacle means, indicated generally at 50, includes a cavity 51 formed integrally of the child safety seat in the base 11 by the integrally molded top wall 52, bottom wall 53 and side walls 54 and 55. As seen in FIG. 2, top wall 52 is a continuation of the seat wall 56, with a guide channel 57 to entrain the crotch strap 29 as it passes into cavity 51. At the rear juncture of top wall 52 and bottom wall 53, a webbing slot 58 is provided to allow back strap 31 to pass into chamber 51 where the releasable buckling parts, indicated generally at 40, are normally maintained.

In addition to the guide means of recess or slot 57, a fitting 60 may be provided on the forward juncture of walls 52 and 56, where crotch strap 29 passes beneath seat wall 56, to securely entrain crotch strap 29 thereto and to prevent the buckling part in cavity 51 from being inadvertently removed from the cavity and to discourage possible nonuse of the harness means.

The buckle receptacle cavity 51, is further provided with a slight recessed area in the upper portions thereof provided by the recess 70 in wall 52 relative to the more forward portions 71 thereof. The buckling parts, indicated generally at 40, are therefore not only positioned beneath the seat, but are recessed back up under the seat surface 56 upon which the child sits to make the buckling parts quite inaccessible to the child passenger although readily accessible to other vehicle passengers.

From the foregoing detailed description of a preferred exemplary embodiment of the child safety seat construction in accordance with the present invention, it should be appreciated by those skilled in the art that the improvement in buckle receptacle means for positioning the seat harness buckling parts in a generally child passenger inaccessible location achieves the objects aforestated. Those skilled in the art should also take notice that other forms, embodiments or variations of the present child safety seat construction may be made within the scope and spirit of the present invention which is defined and limited only by the following claims.

We claim:

1. In a child safety seat having a child seating surface and a supporting base structure securable to a vehicle seat by a pre-existing vehicle seat belt and wherein the child seat is provided with its own child seat safety harness having releasable buckling parts to facilitate the child's entry and egress of the child seat when the latter is secured by said pre-existing vehicle seat belt to the vehicle seat, the improvement comprising the provision of:

buckle receptacle means in said child seat base structure positioned generally under said child seating surface for receiving the child seat safety harness buckling parts and maintaining them in a substantially inaccessible location relative to a child seated in said child safety seat.

2. The provision in child safety seat of claim 1 wherein said buckle receptacle means comprises:

a cavity formed integrally of the child safety seat with a forwardly directed opening for manipulation of the buckling parts when positioned therein.

3. The provision in child safety seat of claim 2 wherein said buckle receptacle means comprises:

a guide slot through a rear portion of said seat base adjacent said cavity to facilitate the passage of a portion of said harness from said cavity to a position exteriorally and rearwardly of said child safety seat.

4. The provision in child safety seat of claim 3 wherein said buckle receptacle means comprises:

guide means formed at a forward upper portion of said cavity for guiding a portion of said harness into said cavity.

5. In a child safety seat construction including a seat mounted upon a pedestal-type base positionable upon a passenger seat of vehicles and secured thereto by the pre-existing vehicle seat belt, the improvement comprising the provision of:

a child safety harness mounted entirely on said child safety seat and having buckling parts thereof;
a buckle-receiving cavity in said pedestal-type base beneath said seat and opening forwardly thereof to receive said child safety harness buckling parts;
a safety belt guide means in a forward portion of said seat above and adjacent to said cavity; and
safety belt guide slot means through a rearward portion of said pedestal-type base and communicating with said cavity for passing a safety belt associated with said seat therethrough, whereby said safety belt may be entrained through said guide means and guide slot means with a belt buckle thereof positioned in said cavity in a generally inaccessible location relative to a child seated in said child safety seat while being readily available to others.

6. The provision in child safety seat construction of claim 5 wherein said child safety seat and buckle-receiving cavity are formed integrally of one another.

7. The provision in child safety seat construction of claim 5 wherein said belt buckle comprises releasably connectable parts, each mounted to a safety belt end, and wherein guide means are provided on a forward portion of said seat generally adjacent and above said cavity for entraining a safety belt therethrough with an associated buckling part retained thereunder generally adjacent said cavity.

8. The improvement in child safety seat construction of claim 5 wherein a safety belt guide slot is provided through a rear portion of said cavity in said pedestal-type base to facilitate the passage of a safety belt therethrough but preventing the passage of a belt end fitting out of said cavity therethrough.

* * * * *